United States Patent Office 2,811,529
Patented Oct. 29, 1957

2,811,529

NAPHTHYLAMINO OXAZOLINES

Barry M. Bloom, Jackson Heights, N. Y., assignor to Chas. Pfizer & Co., Inc., Brooklyn, N. Y., a corporation of Delaware No Drawing. Application May 25, 1956,
Serial No. 587,224

7 Claims. (Cl. 260—307)

This invention is concerned with new and useful therapeutic agents and the process by which they are prepared. In particular, it is concerned with compounds which are effective regulators of the central nervous system. They are especially useful as tranquilizing agents and may also be used to potentiate the effects of anesthetics, hypnotics, narcotics and analgesics.

The compounds of this invention are substituted and unsubstituted 2-(1'-naphthylamino)-oxazolines, their pharmaceutically acceptable acid addition salts and N-(1-naphthyl-N'-(β-substituted ethyl)-ureas. The latter compounds are not only intermediates for the preparation of the oxazolines but are also useful as tranquilizing agents and as potentiators for anesthetics, hypnotics, narcotics and analgesics as explained more fully hereinafter.

N-(1-naphthyl)-N'-(β-substituted ethyl)-ureas are prepared by the reaction between a 1-naphthyl isocyanate and an alkyl amine with certain substituents to be recited hereinafter in a position β to the amino group. Alternatively the products are prepared by the reaction between a 1-naphthylamine and an alkyl isocyanate with similar substituents in a position β to the isocyanate group. Thus, it is possible to prepare N-(1-naphthyl)-N'-β-bromoethyl urea by the reaction between 1-naphthyl isocyanate and β-bromoethylamine, or by the reaction between 1-naphthylamine and β-bromethyl isocyanate. In either case the oxazolines of my invention are obtained by the elimination of hydrogen bromide from the bromoethyl urea. The preparation of 2-(1'-naphthylamino)-oxazoline by both of these methods is shown below.

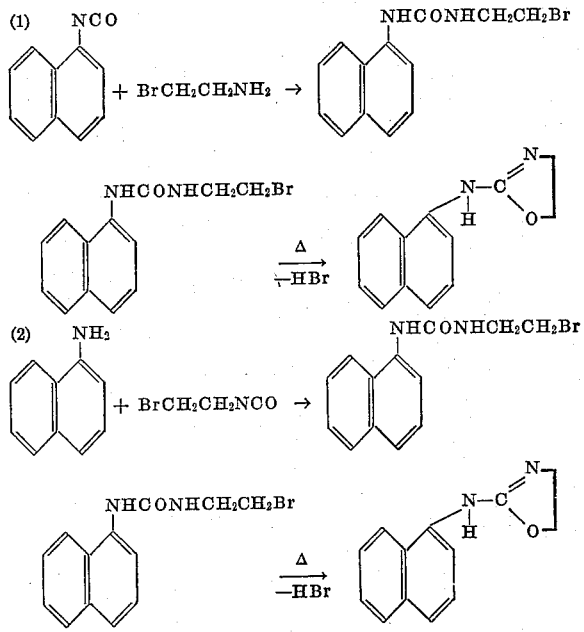

In the reaction shown above the β substituted alkyl amine and isocyanate are bromoethyl compounds and the oxazoline which is prepared is unsubstituted on both of the methylene groups. By choice of the proper amine or isocyanate it is possible to prepare oxazolines with one or both of the methylene groups either monosubstituted or disubstituted. It is, therefore, also intended to include within the purview of this invention oxazolines in which either or both of the methylene groups are substituted with at least one alkyl group containing up to four carbon atoms, the total number of carbon atoms in these substituents being from one to eight. As an example of the preparation of this type of compound, 2-(1'-naphthylamino)-4-ethyl-oxazoline can be prepared by reacting 1-naphthyl isocyanate with β-bromobutylamine or by reacting 1-naphthylamine with β-bromobutyl isocyanate and subsequently heating.

For the preparation of the active urea compounds of this invention the bromine of the above reactions may be replaced with other halogens such as chlorine or iodine, or with alkyl or aryl sulfonyl groups such as methanesulfonyloxy or p-toluenesulfonyloxy. In these cases, the active oxazoline is formed by the elimination of hydrogen chloride, hydrogen iodide, methanesulfonic acid and p-toluenesulfonic acid respectively. Since the aminooxazolines are basic in nature the liberated acid, which has been eliminated from the urea compound, adds to it to form an acid addition salt. The free base may be liberated from the acid addition salt using an alkaline reagent such as ammonium hydroxide, sodium hydroxide, sodium bicarbonate, calcium oxide and other obvious equivalents.

The hydrogen atoms of the naphthyl group in the above reactions may be replaced with certain substituents to reduce or enhance the therapeutic effect of the unsubstituted compounds. These substituents include from one to three alkyl groups, alkoxy groups and thioalkyl groups containing up to four carbon atoms, as well as from one to three chlorine, bromine, or iodine atoms.

The α and β carbon atoms of the ethyl portion of the N-(1-naphthyl)-N'-(β-substituted ethyl)-urea which are therapeutically active and may be used for preparing the active oxazolines of the present invention may be substituted with alkyl groups containing from one to four carbon atoms. The total number of substituent carbon atoms being from one to eight. The compound which will give 2-(1'-naphthylamino)-4,4,5,5-tetraethyl-oxazoline is N-(1-naphthyl)-N'-(α,α,β,β-tetraethyl-β-halo)-ethyl urea. Similarly, N-(1-naphthyl)-N'-(α,α-dibutyl-β-halo)-ethyl urea and N-(1-naphthyl-N'-(α,β-dibutyl-β-halo)-ethyl urea will yield respectively 2-(1'-naphthylamino)-4,4-dibutyl oxazoline and 2-(1'-naphthylamino)-4,5-dibutyl oxazoline.

The following list is illustrative of compounds of this invention.

N-(1-naphthyl)-N'-β-chloroethyl urea.
N-(4-chloro-1-naphthyl) - N' - β - (p - toluenesulfonyloxy)-ethyl urea.
N-(2,4-diodo-1-naphthyl)-N'-β-iodoethyl urea.
N-(2,5-dibromo-1-naphthyl) - N' - (α - butyl-β-methanesulfonyloxy)-ethyl urea.
N-(2,4,6-trichloro-1-naphthyl) - N' - (α - n - propyl-β-chloro)-ethyl urea.
N-(4-ethyl-1-naphthyl)-N'-β-bromoethyl urea.
N-(1-naphthyl)-N'-(α,α,dimethyl)-β-bromoethyl urea.
N-(2,4-diethyl-1-naphthyl)-N'-β-iodoethyl urea.
N-(3-n-butoxy-1-naphthyl) - N' - β - (methanesulfonyloxy)-ethyl urea.
N-(2,3-dimethoxy-1-naphthyl) - N' - (α - methyl-β-p-toluenesulfonyloxy)-ethyl urea.
N-(2,3,5-di-sec-butoxy-1-naphthyl) - N' - β - bromoethyl urea.

N-(2,3-dithiopropyl-1-naphthyl)-N'-β-bromoethyl urea.
N-(2,5-dithiomethyl-1-naphthyl) - N' - (α - methyl-β-butyl-β-iodo)-ethyl urea.
N-(2,5-dithioethyl-1-naphthyl) - N' - (α,β - dimethyl-β-bromo)-ethyl urea.
N-(2,3-diethoxy-1-naphthyl)-N'-β-chloroethyl urea.
2-(3',4'-dichloro-1'-naphthylamino)-oxazoline.
2-(3'-bromo-1'-naphthylamino)-4-methyl-oxazoline.
2-(4'-ethyl-1'-naphthylamino)-3,4-dimethyl-oxazoline.
2-(3',4',5'-triiodo-1'-naphthylamino)-oxazoline.
2-(3',4' - dithiomethyl - 1' - naphthylamino)-4-n-butyl-oxazoline.
2-(2',3',5'-tri-sec-butoxy-1'-naphthylamino)-oxazoline.
2-(3',4'-dimethoxy - 1' - naphthylamino) - 4,5 - diethyl-oxazoline.
2-(4'-thio-tert-butyl-1'-naphthylamino)-oxazoline.
2-(3',4'-diethoxy - 1' - naphthlamino) - 4,5 - dimethyl-oxazoline.
2-(4'-thioisopropyl-1'-naphthylamino)-5-ethyl-oxazoline.

The reaction between the isocyanate and amine of this invention is conveniently carried out in benzene or an equivalent aromatic solvent. Aliphatic solvents particularly halogenated and nitrated solvents are also useful. There may be mentioned by way of example chloroform, carbon tetrachloride, ethylene dichloride, chlorobenzene, toluene, xylene, nitrobenzene and nitrotoluene.

The reaction between an amine and an isocyanate generally takes place without the application of heat. In fact, with some of the more reactive compounds it is best to carry out the reaction in an ice bath. However, as in other reactions of this type, the progress of the reaction may be hastened by the use of heat. With certain of the more inactive reactants, it may even be necessary to apply heat. It has been found that temperatures from 0° to 110° C. are useful, and that most of the amines and isocyanates of this invention react below 50° C.

Formation of an oxazoline acid addition salt by the elimination of an acid from the urea compound is best carried out in refluxing aqueous solution although lower aliphatic alcohols such as, for example, methanol, ethanol, propanol, or butanol may be used.

Although both reactions of the synthesis proceed readily at atmospheric pressure, for certain applications it may be desirable to use increased pressure. Pressures as high as one hundred atmospheres may be useful.

The following experiment is cited as an example of the tranquilizing action of these new therapeutic agents. Three monkeys were injected intravenously with 1 mg./kg. of one of the compounds of this invention. Prior to the injection the monkeys objected strenuously to the approach of man and when picked-up attempted to bite and scratch their handlers. However, a short time after injection it was found that the animals could be approached and petted without any difficulty. When left alone the animals dozed lightly, but when approached they would respond and would accept and eat foods.

Even though the compounds of my invention appear to have no anesthetic action of their own, they do potentiate the effect of anesthetics. For example, it was found that rats would remain anesthetized about one hour under the influence of 50 mg./kg. of the anesthetic 21-hydroxypregnanedione-sodium succinate when it was injected intravenously, but the time was almost doubled when the rats were intravenously injected with 10 mg./kg. of one of the compounds of my invention twenty minutes prior to the 21-hydroxy-pregnanedione-sodium succinate injection. When 10 mg./kg. of this same compound was used alone, it did not anesthetize the rats.

Each of the types of compounds of this invention has its own specific advantages. For example, although both the ureas and the oxazoline are effective therapeutically the oxazolines produce their effect in a shorter time. On the other hand, the ureas, while they require somewhat longer time to take their effect, are less toxic and can, therefore, be administered in larger dosages. This suggests that under certain circumstances it may be advantageous to administer both agents simultaneously to produce both a rapid and a prolonged therapeutic action.

The ureas are neutral and do not form acid addition salts. The oxazolines, however, are weakly basic and do form acid addition salts, which because of their water solubility are more readily utilizable for the preparation of aqueous parenteral solutions.

With reference to the oxazolines of this invention, it is specifically intended to include within the purview of the invention the acid addition salts which these compounds form with acids having a pharmaceutically acceptable anion. The term, "pharmaceutically acceptable anion" has a definite meaning to one skilled in the art. It is defined as a non-toxic anion of any of the simple acids commonly used therapeutically to neutralize basic medicinal agents when the salt thereof is to be administered to a human host. These acids include, for example, hydrochloric, hydrobromic, hydriodic, sulfuric, succinic, maleic, tartaric, citric, glycolic and others. The pharmaceutical activity of the molecule is primarily a function of the cation, the anion serving chiefly to supply electric neutrality.

The urea compounds of this invention are remarkable for their low toxicity. It was found, for example, that with one of them the oral $LD_{50}$ in mice was about 875 mg./kg. and the intraperitoneal $LD_{50}$ was 800 mg./kg. With the rat the oral $LD_{50}$ was 930 mg./kg. and the intraperitoneal $LD_{50}$ 660. This low toxicity level makes it possible to administer therapeutic dosages of the drugs by either the oral or parenteral route without the danger of approaching the toxicity level.

The agent of this invention may be administered alone, but are generally administered with a pharmaceutical carrier selected on the basis of the chosen route of administration and standard pharmaceutical practice. For example, they may be administered orally in the form of tablets or capsules containing such excipients as starch, milk sugar, certain types of clay, etc. They may be administered orally in the form of elixirs or oral suspensions which may contain coloring and flavoring agents. They may be injected parenterally, and for this use may be prepared in the form of sterile aqueous solutions containing other solutes such as saline or glucose in sufficient quantity to make the solution isotonic. For intramuscular administration compositions of the compounds of this invention may be prepared in an oil base such as peanut or sesame oil.

The physician or veterinarian will determine the dosage which will be most suitable for a particular application; and, as might be expected, it will vary with the particular drug chosen and the desired effect. It will generally be found that when the drugs are administered orally a larger quantity will be required to produce the same effect as a smaller quantity given parenterally. It has been found that parenteral administration of from 0.5 mg. to 250 mg. of active agent generally gives the desired effect.

The compositions of this invention may take a variety of forms. Various diluents may be employed and the percentage of active ingredients may be varied. It is necessary that the active ingredient form a proportion of the composition such that a suitable dosage form will be obtained. Obviously several dosage unit forms may be administered at about the same time. Although compositions with less than 0.005 precent by weight of active ingredients are suitable, it is preferred to use compositions containing not less than 0.005 percent of the active agent because otherwise the amount of carrier becomes excessively large. Activity increases with the concentration of the active agent. The percentage by weight of active agent may be 10, 50, 75, 95 percent or even higher. Dosage unit forms may be prepared with a

EXAMPLE I

N-(1-naphthyl)-N'-β-bromoethyl urea

A solution of ice cold 50% potassium hydroxide (150 g.) is shaken with a suspension of 123 g. of β-bromoethylamine hydrobromide in 420 ml. of benzene. The benzene layer containing the free base is separated and dried over a small amount of potassium hydroxide. The drying agent is removed by filtration. To this solution an equimolar benzene solution of 1-naphthyl isocyanate is added dropwise with cooling. The solution is allowed to stand for one hour during which time the product separates as a white powder. It is recrystallized from ethyl acetate and melts at 146.8 to 147.2° C.

Analysis for: $C_{13}H_{13}ON_2Br$—

|  | Calculated | Found |
|---|---|---|
| Carbon | 53.26 | 53.05 |
| Hydrogen | 4.47 | 4.38 |
| Nitrogen | 9.56 | 9.76 |
| Bromine | 27.26 | 27.11 |

EXAMPLE II

2-(1'-naphthylamino)-oxazoline

One liter of water is brought to boiling and 15 g. of N-(1-naphthyl)-N'-β-bromoethyl urea is added. At the end of fifteen minutes reflux time all except a very small amount of material dissolves. The flask is cooled in an ice bath and the small amount of insoluble material along with an additional quantity of material which separates on cooling is removed by filtration. A 14% solution of ammonium hydroxide (30 ml.) is added slowly and a gummy precipitate forms. The precipitate is extracted with three 250 ml. portions of chloroform and the combined extract washed with water. The organic layer is dried over anhydrous sodium sulfate and concentrated in vacuo. A pinkish crystalline residue forms which is triturated with ether and recrystallized from isopropanol. It melts at 123.6 to 126.0° C.

Analysis for: $C_{13}H_{12}N_2O$—

|  | Calculated | Found |
|---|---|---|
| Carbon | 73.56 | 73.76 |
| Hydrogen | 5.70 | 5.79 |
| Nitrogen | 13.20 | 13.17 |

EXAMPLE III

N-(2-chloro-1-naphthyl)-N'-β-chloroethyl urea

A solution of ice cold 50% potassium hydroxide in (150 g.) is shaken with a suspension of 0.6 moles of β-chloroethylamine hydrochloride in 420 ml. of benzene. The benzene layer containing the free base is separated and dried over a small amount of potassium hydroxide. The drying agent is removed by filtration. To this solution an equimolar benzene solution of 2-chloro-naphthyl isocyanate is added dropwise with cooling. The solution is allowed to stand for one hour during which time the product separates.

EXAMPLE IV

2-(2'-chloro-1'-naphthylamino)-oxazoline

One liter of water is brought to boiling and 15 g. of N-(2-chloro-1-naphthyl)-N'-β-chloroethyl urea is added. The solution is refluxed for fifteen minutes, cooled and filtered. The solution is neutralized with 14% ammonium hydroxide and the precipitate which forms extracted with three 250 ml. portions of chloroform. The combined extracts are washed with water, the organic layer is dried over anhydrous sodium sulfate and concentrated in vacuo. The crystalline residue which forms is triturated with ether and recrystallized.

EXAMPLE V

N-(3,4-dimethyl-1-naphthyl)-N'-β-chloroethyl urea

A solution of ice cold 50% potassium hydroxide (150 g.) is shaken with a suspension of 0.6 mole of chloroethylamine hydrochloride in 420 ml. of benzene. The benzene layer containing the free base is separated and dried over a small amount of potassium hydroxide. The drying agent is removed by filtration. To this solution an equimolar benzene solution of 3,4-dimethyl-1-naphthyl isocyanate is added dropwise with cooling. The solution is allowed to stand for one hour during which time the product separates.

EXAMPLE VI

2-(3',4'-dimethyl-1'-naphthylamino)-oxazoline

One liter of water is brought to boiling and 15 g. of N-(3,4-dimethyl-1-naphthyl)-N'-β-chloroethyl urea is added. The solution is refluxed for fifteen minutes, cooled and filtered. A 10% solution of sodium hydroxide is added slowly and the precipitate which forms extracted with three 250 ml. portions of chloroform. The combined extracts are washed with water and the organic layer dried over anhydrous sodium sulfate. The solvent is concentrated in vacuo and the residue which forms is triturated with ether and recrystallized.

EXAMPLE VII

N-(2,5-diiodo-1-naphthyl)-N'-β-(p-toluenesulfonyloxy)-ethyl urea

A solution of ice cold 50% potassium hydroxide (150 g.) is shaken with a suspension of 0.6 mole of β-(p-toluenesulfonyloxy)-ethylamine hydrochloride in 420 ml. of benzene. The benzene layer containing the free base is separated and dried over a small amount of potassium hydroxide. The drying agent is removed by filtration. To this solution an equimolar benzene solution of 2,5-diiodo-1-naphthyl isocyanate is added dropwise with cooling. The solution is allowed to stand for one hour during which time the product precipitates.

EXAMPLE VIII

2-(2',5'-diiodo-1'-naphthylamino)-oxazoline

One liter of water is brought to boiling and 15 g. of N-(2,5-diiodo-1-naphthyl)-N'-β-(p - toluenesulfonyloxy)-ethyl urea is added. The solution is refluxed for fifteen minutes, cooled and filtered. A 5% solution of sodium bicarbonate is added and the precipitate which forms is extracted with three 250 ml. portions of chloroform. The combined extracts are washed with water, the organic layer is dried over anhydrous sodium sulfate and concentrated in vacuo. The residue which forms is triturated with ether and recrystallized.

EXAMPLE IX

N-(3,5-dithiopropyl-1-naphthyl)-N'-(β-methyl-β-chloro)-ethyl urea

A solution of ice cold 50% potassium hydroxide (150 g.) is shaken with a suspension of 0.6 mole of β-chloropropylamine hydrochloride in 420 ml. of benzene. The benzene layer containing the free base is separated and dried over a small amount of potassium hydroxide. The drying agent is removed by filtration. To this solution an equimolar benzene solution of 3,5-dithiopropyl-1-naphthyl isocyanate is added dropwise with cooling. The solution is allowed to stand for one hour during which time the product separates.

EXAMPLE X

2-(3',5'-dithiopropyl-1'-naphthylamino)-5-methyl-oxazoline

One liter of water is brought to boiling and 15 g. of 1-(3,5-dithiopropyl-1-naphthyl)-N'-chloropropyl urea is added. The solution is refluxed for fifteen minutes, cooled and filtered. A 14% solution of ammonium hydroxide is added slowly and the precipitate which forms extracted with three 250 ml. portions of chloroform. The combined extracts are washed with water and the organic layer dried over anhydrous sodium sulfate and concentrated in vacuo. The crystalline residue which forms is triturated with ether and recrystallized.

EXAMPLE XI

N-(1-naphthyl)-N'-β-chloroethyl urea

A solution of 1.17 g. of β-chloroethyl isocyanate dissolved in 25 ml. of ether is slowly added with stirring to ether solution (15 ml.) of 1.43 g. of 1-naphthylamine under anhydrous conditions while cooling in an ice bath. Crystallization begins during the addition of the isocyanate and continues while the solution stands for one hour. The suspension is filtered to obtain N-(1-naphthyl)-N'-β-chloroethyl urea which melts at 158.8 to 160° C. after recrystallization from ethyl acetate.

Analysis for: $C_{13}H_{13}ON_2Cl$—

|  | Calculated | Found |
|---|---|---|
| Carbon | 62.77 | 63.06 |
| Hydrogen | 5.27 | 5.25 |

This compound was converted to 2-(1'-naphthylamino)-oxazoline using the procedure of Example II.

EXAMPLE XII

N-(1-naphthyl)-N'-β-iodo ethyl urea

A solution of β-iodoethylisocyanate dissolved in ether is slowly added with stirring to an ether solution of 1-naphthylamine under anhydrous conditions while cooling in an ice bath. Crystallization begins during the addition of the isocyanate and continues while the solution stands for one hour. The suspension is filtered to obtain N-(1-naphthyl)-N'-β-iodoethyl urea which melts at 184.6 to 185.8° C.

Analysis for: $C_{13}H_{13}ON_2I$—

|  | Calculated | Found |
|---|---|---|
| Carbon | 45.90 | 46.68 |
| Hydrogen | 3.85 | 3.91 |
| Nitrogen | 8.24 | 8.20 |

EXAMPLE XIII

N-(1-naphthyl)-N'-(β-n-butyl-β-chloro)-ethyl urea

A solution of ice cold 50% potassium hydroxy (150 g.) is shaken wit ha suspension of 0.6 mole of β-chlorohexylamine hydrochloride in 420 ml. of benzene. The benzene layer containing the free base is separated and dried over a small amount of potassium hydroxide. The drying agent is removed by filtration. To this solution an equimolar benzene solution of 1-naphthyl isocyanate is added dropwise with cooling. The solution is allowed to stand for one hour during which time the product separates.

EXAMPLE XIV

2-(1'-naphthylamino)-4-n-butyl-oxazoline

One liter of water is brought to boiling and 15 g. of N-(1-naphthyl)-N'-β (chlorohexyl) urea is added. The solution is refluxed for fifteen minutes, cooled and filtered. A 14% solution of ammonium hydroxide is added and the precipitate which forms extracted with three 250 ml. portions of chloroform. The combined extracts are washed with water. The organic layer is dried over anhydrous sodium sulfate and concentrated in vacuo. The crystalline residue which forms is triturated with ether and recrystallized.

EXAMPLE XV

N-(2-methyl-1-naphthyl)-N'-β-(methanesulfonyloxy)-ethyl urea

A solution of ice cold 50% potassium hydroxide (150 g.) is shaken with a suspension of 0.6 moles of β-(methanesulfonyloxy)-ethylamine in 420 ml. of benzene. The benzene layer containing the free base is separated and dried over a small amount of potassium hydroxide. The drying agent is removed by filtration. To this solution an equimolar benzene solution of 2-methyl-1-naphthyl isocyanate is added dropwise with cooling. The solution is allowed to stand for one hour during which time the product separates.

EXAMPLE XVI

2-(2'-methyl-1'-naphthylamino)-oxazoline

One liter of water is brought to boiling and 15 g. of N-(2-methyl-1-naphthyl)-N'-β-(methanesulfonyloxy)-ethyl urea is added. The solution is refluxed for fifteen minutes, cooled and filtered. A 14% solution of ammonium hydroxide is added slowly and the precipitate which forms extracted with three 250 ml. portions of chloroform. The combined extracts are washed with water. The organic layer is dried over anhydrous sodium sulfate and concentrated in vacuo. The crystalline residue which forms is triturated with ether and crystallized.

EXAMPLE XVII

The compound N-(1-naphthyl)-N'-β-bromoethyl urea is administered intravenously at dosages of one and five mg./kg. to two groups of monkeys. Following the intravenous administration of these drugs the animals could be petted and played with to varying degrees. When left alone the monkeys would doze in a normal fashion. When approached they were aware of the operator and would accept and eat food. The duration of the tranquilizing effect is approximately two to five hours. The animals are found to be normal at the end of a twenty-four hour period.

A similar response is observed when the compound 2-(1'-naphthylamino)-oxazoline is similarly administered although the onset of tranquilization is more rapid.

EXAMPLE XVIII

A total of five rats are administered 50 mg./kg. of 21-hydroxy-pregnanedione-sodium succinate by intravenous injection and the average duration of the anesthetic effect observed to be 58.4±3.6 minutes. With a similar group of rats who received by intravenous injection 10 mg./kg. of N-(1-naphthyl)-N'-β-bromoethyl urea 20 minutes prior to the injection of 50 mg./kg. of 21-hydroxy-pregnanedione-sodium succinate, the duration of the anesthetic effect is increased to 126.3±14.3 minutes. With 10 mg./kg. of N-(1-naphthyl)-N'-β-bromoethyl urea there is no anesthetizing action. Similar effects are observed with other compounds of the invention.

EXAMPLE XIX

A total of seven rats are administered 50 mg./kg. of 21-hydroxy-pregnanedione-sodium succinate by oral administration and the observation duration of the anesthetic effect is 47.4±5.4 minutes. With a similar group of rats who received by oral administration 50 mg./kg. of N-(1-naphthyl)-N'-β-bromoethyl urea two hours prior to the oral administration of 50 mg./kg. of 21-hydroxy-pregnanedione-sodium succinate the duration of the anesthetic effect is increased to 137.3±24.9 minutes. With 10 mg./kg. of N-(1-naphthyl)-N' β-bromoethyl urea there is no anesthetizing action. Similar effects are observed with other compounds of the invention.

EXAMPLE XX

A tablet base is prepared by blending the following ingredients in the proportion by weight indicated.

| | |
|---|---|
| Sucrose U. S. P. | 82.0 |
| Tapioca starch | 13.6 |
| Magnesium stearate | 4.4 |

Into this table there is blended a sufficient amount of N-(1-naphthyl)-N'-(β-ethyl-β-chloro)-ethyl urea to provide tablets each containing 25 mg. of active ingredient.

EXAMPLE XXI

Into the tablet base of Example XX there is blended a sufficient amount of 2-(2'-chloro-1'-naphthylamino)-oxazoline to provide tablets each containing 0.5 mg. of active ingredient.

EXAMPLE XXII

A tablet base is prepared by blending the following ingredients in the proportion by weight indicated.

| | |
|---|---|
| Sucrose U. S. P. | 80.3 |
| Tapioca starch | 13.2 |
| Magnesium stearate | 6.5 |

Into this base there is blended a sufficient amount of N-(1-naphthyl)-N'-β-(methanesulfonyloxy)-ethyl urea to provide tablets each containing 50 mg. of active ingredient.

EXAMPLE XXIII

Into the tablet base of Example XXII there is blended a sufficient amount of 2-(2'-propyl-1'-naphthylamino)-oxazoline to provide tablets each containing one mg. of active ingredient.

EXAMPLE XXIV

An aqueous solution containing 0.005 percent by weight of 2-(1'-naphthylamino)-4-methyl oxazoline hydrobromide is prepared by dissolving the salt in U. S. P. distilled water.

EXAMPLE XXV

Sesame oil is sterilized by heating at 120° C. for two hours. To this oil a sufficient quantity of pulverized N-(1-naphthyl)-N'-β-iodoethyl urea to make a 0.025% suspension by weight. The solid is thoroughly dispersed in the oil with the use of a colloid mill. It is then filtered through a 100 to 150 mesh screen and poured into sterile vials.

What is claimed is:

1. A compound selected from the group consisting of substituted and unsubstituted 2-(1'-naphthylamino)-oxazolines and their pharmaceutically acceptable acid addition salts wherein; (a) the substituents on a substituted naphthyl ring are selected from the group consisting of one to three alkyl, alkoxy and thioalkyl groups containing up to four carbon atoms each and one to three chlorine, bromine and iodine atoms; and (b) each substituent on a substituted methylene group of the oxazoline ring is selected from the group consisting of one to four carbon atom alkyl groups, there being a total of from one to eight carbon atoms in such substituents.

2. 2-(1'-naphthylamino)-oxazoline.
3. 2-(3',4'-dimethyl-1'-naphthylamino)-oxazoline.
4. 2'-(2',5'-diodo-1'-naphthylamino)-oxazoline.
5. 2 - (3',5'- dithiopropyl-1'-naphthylamino)-5-methyl-oxazoline.
6. 2-(2'-methyl-1'-naphthylamino)-oxazoline.
7. A process for the preparation of a 2-(1'-naphthylamino)-oxazoline which comprises heating in a solvent medium a N-(1-naphthyl)-N'-(β-substituted alkyl) urea wherein the β substituents on said alkyl urea are selected from the group consisting of bromine, chlorine and iodine atoms and methanesulfonyloxy and p-toluenesulfonyloxy groups, and precipitating oxazoline by the addition of an alkaline reagent.

References Cited in the file of this patent

UNITED STATES PATENTS

| | | |
|---|---|---|
| 2,027,031 | Engelman | Jan. 7, 1936 |
| 2,253,773 | Engel et al. | Aug. 26, 1941 |
| 2,694,071 | Jacob et al. | Nov. 9, 1954 |
| 2,702,804 | Jacob | Feb. 22, 1955 |
| 2,705,727 | Graham | Apr. 5, 1955 |
| 2,729,677 | Gilbert et al. | Jan. 3, 1956 |